United States Patent
Magliocca

[19]

[11] Patent Number: 5,954,071
[45] Date of Patent: Sep. 21, 1999

[54] PARTS WASHING APPARATUS WITH CENTRIFUGAL FILTER

[76] Inventor: Charles Thomas Magliocca, 11618 Golden Given Rd., Tacoma, Wash. 98445

[21] Appl. No.: 08/783,692

[22] Filed: Jan. 15, 1997

[51] Int. Cl.⁶ ..................................................... B08B 3/02
[52] U.S. Cl. .......................... 134/109; 134/110; 134/111; 210/360.1
[58] Field of Search .................... 134/109, 110, 134/111, 201; 210/360.1; 68/23, 18 F; 494/36

[56] References Cited

U.S. PATENT DOCUMENTS

| 1,385,724 | 7/1921 | Smith et al. . | |
|---|---|---|---|
| 2,785,999 | 3/1957 | Ruthner | 134/109 |
| 3,003,347 | 10/1961 | Morris et al. | 134/109 |
| 3,200,622 | 8/1965 | Brucken . | |
| 3,295,689 | 1/1967 | Arvanitakis . | |
| 3,313,311 | 4/1967 | Gilson | 134/109 |
| 3,326,689 | 6/1967 | Pranovi . | |
| 3,378,018 | 4/1968 | Lawter | 134/109 |
| 3,454,428 | 7/1969 | Hittel | 134/109 |
| 3,765,430 | 10/1973 | Muller | 134/109 |
| 4,347,861 | 9/1982 | Clearman et al. | 134/109 |
| 5,306,423 | 4/1994 | Hultsch . | |
| 5,431,178 | 7/1995 | Chiu | 134/109 |
| 5,460,717 | 10/1995 | Grimwood et al. | 134/109 |
| 5,505,863 | 4/1996 | Danon et al. . | |
| 5,520,028 | 5/1996 | Kim et al. . | |

FOREIGN PATENT DOCUMENTS

| 1472053 | 4/1989 | U.S.S.R. | 134/109 |
|---|---|---|---|
| 1591943 | 9/1990 | U.S.S.R. | 134/57 D |

*Primary Examiner*—Frankie L. Stinson
*Attorney, Agent, or Firm*—Hughes & Schacht, P.S.; Robert B. Hughes

[57] ABSTRACT

A parts washing apparatus with a centrifugal filter that substantially reduces the need to replace it solvent. The parts washing apparatus comprises a parts washing basin that has a centrifugal filter assembly located below its drain. The parts washing basin sits on top of a solvent container. When in use, the solvent is pumped from the solvent container to the parts washing basin, where it is used to clean parts. The now contaminated solvent flows down a drain in the parts washing basin, through a screen to the centrifugal filter assembly. A disposable filter is included in the filter receptacle of the centrifugal filter assembly. The contaminated solvent flows from the drain, into a disposable filter element located in a spinning filter receptacle, where centrifugal force draws the solvent back into the solvent container while the materials washed from the part remains in the disposable filter element. If desired, separate filter assembly can also be used to polish the solvent. A "retrofit" application for mounting the centrifugal filter assembly in existing parts washers is also described.

48 Claims, 5 Drawing Sheets

PARTS WASHING APPARATUS WITH CENTRIFUGAL FILTER

BACKGROUND OF THE INVENTION

1. Field of the Invention

This invention relates generally to the field of parts washing apparatus and particularly to a parts washing apparatus having a centrifugal filter to separate foreign waste elements from a cleaning solvent.

2. Background Art

Parts washers are widely used in industrial applications, and in particular, automotive service shops. The most familiar part washer can be found in almost any service station in the country. It is comprised of a sink with a spigot and a drain that sits upon a standard 45 gallon drum. The drum is partially filled with a parts washing solvent. The solvent is pumped from the drum, through the spigot, where it flows over the dirty part, into the sink's drain, from which it falls back into the drum. In this manner, the solvent continuously flows over the dirty part while the operator washes the part in the sink.

The problem with these conventional parts washers is that the foreign material washed from the dirty part flows into the drum along with the solvent. In many applications, the foreign material will be comprised of metal shavings, dirt, sand, grit, and oil particulates. Since much of this debris will remain suspended in the solvent while the pump is running, the pump is continuously subjected to substances that will damage its internal seals. Much of the background art in this area has addressed this particular problem by placing a filter upstream of the pump to strain the foreign debris from the solvent before it reaches the pump. For instance, in U.S. Pat. No. 4,056,114 (Boutillete), the pump is surrounded by a filter element. U.S. Pat. No. 3,890,988 (Lee) teaches a pump mounted at the top of a truncated cone that rests at the bottom of a solvent tank. The cone is made from a screen that is intended to filter the solvent before it reaches the inlet of the pump.

In U.S. Pat. No. 3,378,019 (Riolo et al.) the patent teaches a paper filter located below the drain. The solvent flows through the filter with only the assistance of gravity. U.S. Pat. No. 5,522,814 (Olson) also teaches a gravity filter comprising a compartment filled with waste cotton located below the drain. U.S. Pat. No. 2,675,012 (Scales) notes that these types of gravity filters are quickly obstructed by the gunk and will not filter the solvent. Accordingly, Scales teaches a complex set of superposed sludge settling trays of successively decreasing diameters. U.S. Pat. No. 2,085,075 (Delano) teaches a portable crankcase flusher and cleaner that introduces, extracts, and filters cleaning fluid from the crankcase of an automobile using a complicated reversible one-way valve.

Trapping the gunk and the solvent together until the solvent drains from the filter, however, insures that the gunk will retain a substantial amount of the solvent. This wet waste material will eventually condense into a thick, gummy, oily substance, commonly referred to in the art as "gunk."

The second major effect of the foreign matter flowing freely into the drum along with the solvent is that, as the foreign material settles to the bottom of the drum it will accumulate and condense into gunk. This gunk layer will eventually foul, and probably damage, the pump. In any case, the solvent in the drum will eventually be so full of gunk and suspended matter that it will have to be replaced and the old solvent disposed of. In the age before hazardous waste laws, this problem was addressed in the art by using plastic drum liners that would capture the solvent, the foreign materials, and the gunk so that they could all be disposed of together—, probably ending up in a landfill (assuming the liner made it that far without being punctured). This disposable liner concept is taught in U.S. Pat. No. 3,890,988 (Lee). U.S. PAT. No. 3,552,814 (Olson); U.S. Pat. No. 4,056,114 (Boutilette).

Contrary to a suggestion in the Lee patent, it is no longer possible to remove the gunk and solvent together in a plastic liner to be disposed of in a landfill or, for the matter, in the dirt behind the service station. The solvents used in parts washers are now classified as hazardous waste materials and are heavily regulated by both state and federal law. There are severe civil and criminal penalties for the improper disposal of the waste materials associated with these parts washers. Similarly, it is no longer practical to clean the gunk from the parts washers because the gunk still has to be disposed of as hazardous waste.

Because of the hazardous waste laws, a huge industry has developed to service parts washers. The 1995 annual report from the largest of these service providers reports reclaiming more than 210 million gallons of contaminated fluids and discloses revenues in this area are in excess of $240 million dollars per year. Servicing the parts washers usually means removing the sink from the drum, capping the used drum off, and transporting the used solvent and gunk contained in the drum to a reprocessing plant. Evidencing the major concern that the industry has over hazardous waste liability, this service provider also advertises that it indemnifies the customer against liability hazardous waste spills that may occur while the solvent is being transported.

SUMMARY OF THE INVENTION

The various patents described above all address the same problem—dealing with the separation and removal of the gunk and preventing it from damaging the pump. They also all share a common problem—there is no way to stop the formation of the paste-like gunk that clogs filters, destroys pumps, and lessens the useful life of the solvent. The parts washing apparatus of the present invention significantly reduces these problems, and the hazardous waste problems associated with parts washers, by materially reducing the formation of the gunk by reducing the foreign waste material that reaches the solvent tank. This is done by employing a centrifugal filter assembly between the drain of the parts washing basin and the solvent storage tank. In this position, the centrifugal filter removes most of the foreign particulate matter from the solvent before the solvent is returned to its storage container. More importantly, however, is that the centrifugal filter removes the foreign waste material from the solvent before it can condense into the paste-like gunk at the bottom of the solvent storage tank. Instead, the centrifugal action of the filter squeezes the solvent from the foreign waste materials while the foreign waste material is still a small part of the solvent stream. A purified solvent is returned to the container, while the mostly-dried foreign matter is retained in the filter.

In the preferred form, a secondary "screen" filter is used at the drain of the basin to capture larger foreign objects, including components that may fall off the part being washed. A tertiary filter is also preferably placed in communication with the solvent transfer means between the pump output and the solvent inlet to "polish" the solvent by removing any fine particles or oils that may remain suspended in the solvent before it reaches the parts washing basin. These three filtering means enable the solvent to be recirculated almost indefinitely while remaining mostly free of gunk formation.

It is important to note that most of the foreign material is captured by the primary centrifugal filter, the secondary screen filter, and tertiary polishing filter, leaving a relatively clean solvent for reuse. In particular, these filters solve the problems associated with gunk accumulating at the bottom of a tank. The centrifugal action of the primary centrifugal filter spins most of the solvent out of the foreign material, leaving behind a body of foreign materials captured in the filter that is almost dry. Instead of capping off the whole solvent drum and sending it for reprocessing, the only material that need be sent to a hazardous waste facility are the disposable filters and their contents, which can easily be placed in a canister the size of a coffee can. This means that shipping and waste disposal fees will be significantly less, the danger of a hazardous waste spill will be considerably reduced, and the cost of replacing the solvent will almost be eliminated for most applications.

The parts washer assembly of the present invention can either be constructed as a complete unit or, a retrofit embodiment of the present invention can be installed in existing parts washers to incorporate the design benefits taught herein. In its preferred embodiment, as a complete parts washer, the apparatus is comprised of a parts washing basin that rests upon a drum acting as a solvent reservoir. The washing basin has a safety hood that is designed to drop and smother a fire if the fusible link holding it up is melted by a fire. The washing basin also has a solvent transfer means, (which usually comprises a spigot, but can also be a movable hose,) an access hatch and a drain. The drain is located in the center of the access hatch and the access hatch provides access to a centrifugal filter. The centrifugal filter assembly is mounted below the drain of the parts washing basin with a mounting bracket. The centrifugal filter assembly comprises a filter receptacle is rotatably mounted on the mounting bracket using a sealed bearing. Operatively connected to the filter receptacle is a motor that also is mounted on the mounting bracket. A pump hangs from the mounting bracket by a pump support and is submerged in solvent that partially fills the drum. To remove and replace the filter element located in the filter receptacle, the access hatch is removed from the parts washing basin, exposing the filter receptacle for easy access to the filter element. The filter element is removed from the filter receptacle and stored as hazardous waste for recycling. A replacement filter element is then draped inside the filter receptacle, with its upper edge folded over the upper edge of the filter receptacle, where it is secured to the filter receptacle with a securing means.

In a retrofit embodiment, the mounting bracket, together with the motor and the filter receptacle are removably mounted to the underside of the sink portion of an existing parts washer. The open portion of the filter receptacle should be positioned directly below the existing drain in the sink. The existing pump, or a new one, can be suspended from the mounting bracket using the pump support described below. However, if the original mounting of the existing pump does not get in the way of the retrofit assembly, it may be left in place. In either case, it is preferable that the pump and the centrifugal filter motor be wired in parallel to a single switch 170, so that both operate when the parts washer is turned on. Given the difficulty in retrofitting an access hatch in a existing steel parts washing basin, the hatch assembly will usually be omitted in a retrofit application. Therefore, it is important to mount the centrifugal filter assembly of the retrofit kit to the existing parts washing basin in a removable manner so that the centrifugal filter assembly may be lowered and the filter element in the filter receptacle replaced. Alternatively, most drains found in existing parts washing basins will be about four inches wide, which is usually enough room to reach in through the drain to remove and replace the filter element. A secondary and tertiary filter, as described herein, are also preferably included in the retrofit of an existing parts washer.

DESCRIPTION OF THE PREFERRED EMBODIMENTS

Figure 1:
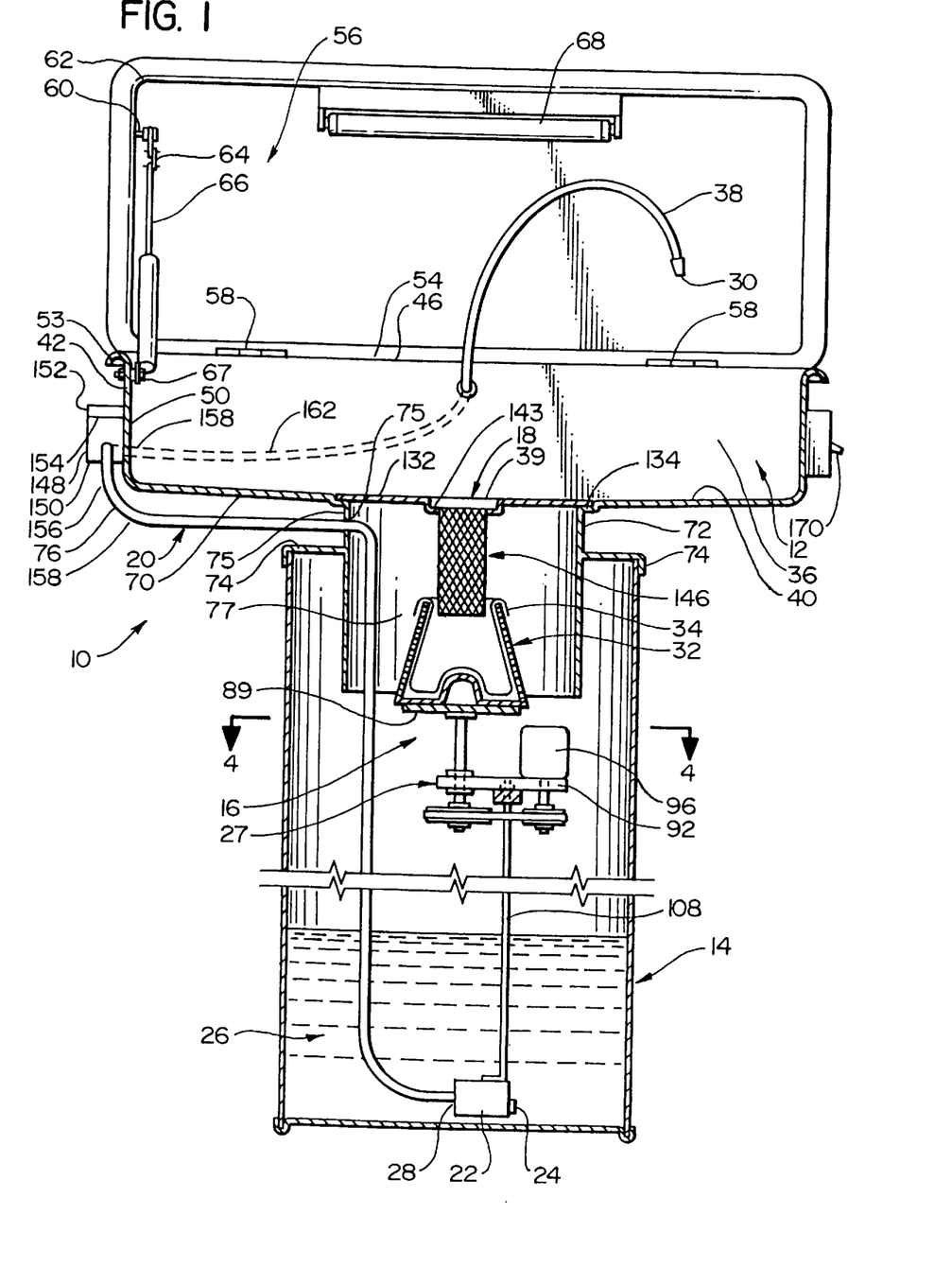
FIG. 1 is a side cross-section view of the preferred embodiment of the parts washing apparatus of the present invention.

In overview, the parts washing apparatus 10 of the present invention, illustrated in FIG. 1, is comprised of a parts washing basin 12, a solvent reservoir 14 upon which the parts washing basin 12 rests, a centrifugal filter assembly 16 mounted to the parts washing basin 12 below its drain 18 and inside the solvent reservoir 14, and a solvent transfer means 20 to transport the solvent 26 from the solvent reservoir 14 to the parts washing basin 12. Attached to a mounting bracket 27 of the centrifugal filter assembly 16, and descending from it, is a pump 22 that has its inlet 24 submerged in solvent 26, and its outlet 28 connected to the solvent transfer means. The solvent 26 is contained in the solvent reservoir 14.

While the parts washing apparatus 10 is in use, the pump 22 pumps solvent 26 from the solvent reservoir 14, through the solvent transfer means 20, where it enters the parts washing basin 12 at a solvent inlet 30. From the solvent inlet 30, the solvent 26 flows over a part placed in the parts washing bin 12 or held under the inlet 30. The solvent 26 is contaminated with foreign matter from the dirty part while the part is being washed. This contaminated solvent 26 flows from the parts washing basin 12, through the drain 18, into a spinning centrifugal filter receptacle 32. The spinning action of the centrifugal filter receptacle 32 employs centrifugal force to drive the solvent through a disposable filter element 34, after which the solvent 26 falls back into the solvent reservoir 14. In this way, the recirculation of the solvent 26 in the parts washing apparatus 10 provides a continuous flow of filtered solvent to the parts washing basin 12 for the washing of dirty parts, while both drying and containing most the waste from the dirty part in the disposable filter element 34.

The preferred embodiment of the present invention will now be described. The parts washing basin 12 has a sink portion 36 with an attached flexible spout 38 acting as an inlet 30 for the solvent 26 and a drain 18 acting as a solvent outlet 39. In some situations, it may be more convenient for the flexible spout 38 to have a connection for a flexible hose, or merely to have a flexible hose substituted for it. The sink portion 36 has a sink bottom wall 40 and a circumferential sink side wall 42. For convenience of description and referring to FIG. 3, the sink wall 42 has a front portion 44 generally nearest the user, a rear portion 46 generally away from the user, a right side portion 48, a left side portion 50, and a top edge portion 52. The top edge portion 52 is blunted or rolled over 53 so as not to present any sharp edges to the user. The sink side wall portion 42 and the top edge portion 52 are usually formed integrally with the sink bottom 40, but separate pieces may be attached to form the sink if easier or more cost effective.

Although the flash point of solvents used in parts washers is fairly high, it is still possible for the solvent to catch on fire. Primarily for this reason, the rear edge 54 of a hood 56 is attached by hinges 58 to the rear portion 46 of the sink side wall 42 (FIG. 1). A support pin 60 is attached to an upper interior edge portion 62 of the hood 56. A fusible link 64 is rotatably attached to the support pin 60 on the hood 56 and then to a support piston 66, which is then rotatably attached to a pin 67 mounted on the left sink side wall 50. The fusible link 64 is designed to melt during a solvent fire, which disengages the support piston 66 or bracket and allows the hood 56 to fall and cover the parts washing basin 12. This contains the fire and deprives it of the oxygen need for combustion. It is preferred to use a piston for the support because the hood 56 is not only used for fire prevention. During normal use, the support piston 66 assists in smoothly lifting the hood 56, and also preventing the hood 56 from suddenly slamming shut. Of course, a hinged bracket of conventional design could be substituted for the piston. A work light 68 can be affixed to the hood 56 for the convenience of the user.

The sink bottom wall 40 has an underside portion 70 located opposite the side that is contained in the sink portion 36. Attached to this sink underside portion 70, surrounding the drain 18, is a downwardly extending collar 72. The collar 72 serves to position the parts washing basin 12 on the solvent reservoir 14, to act as a splash guard for the solvent 26 while it is being centrifuged, and as mounting point for attachment of the centrifugal filter assembly 16 and pump 22. The collar 72 has several laterally extending flanges 74 attached a couple of inches below the sink underside portion 70. To assemble the parts washing apparatus 10, the parts washing basin 12 is lowered from above the solvent reservoir 14 into it, inserting the collar 72 until the flanges 74 rest on the solvent reservoir 14. The spacing between the underside 70 of the parts washing basin 12 and the flanges 74 forms an access portion 75 through which the transfer pipe 76 and any necessary electrical wiring (not shown) to drive the pump 22 and centrifugal filter assembly 16 are placed.

In the preferred embodiment, the solvent reservoir 14 is an industry standard forty-five gallon steel drum. However, any convenient container could be used as long as it is capable of storing solvent in a safe manner and will support the parts washing basin at a comfortable height for the user.

Figure 2:
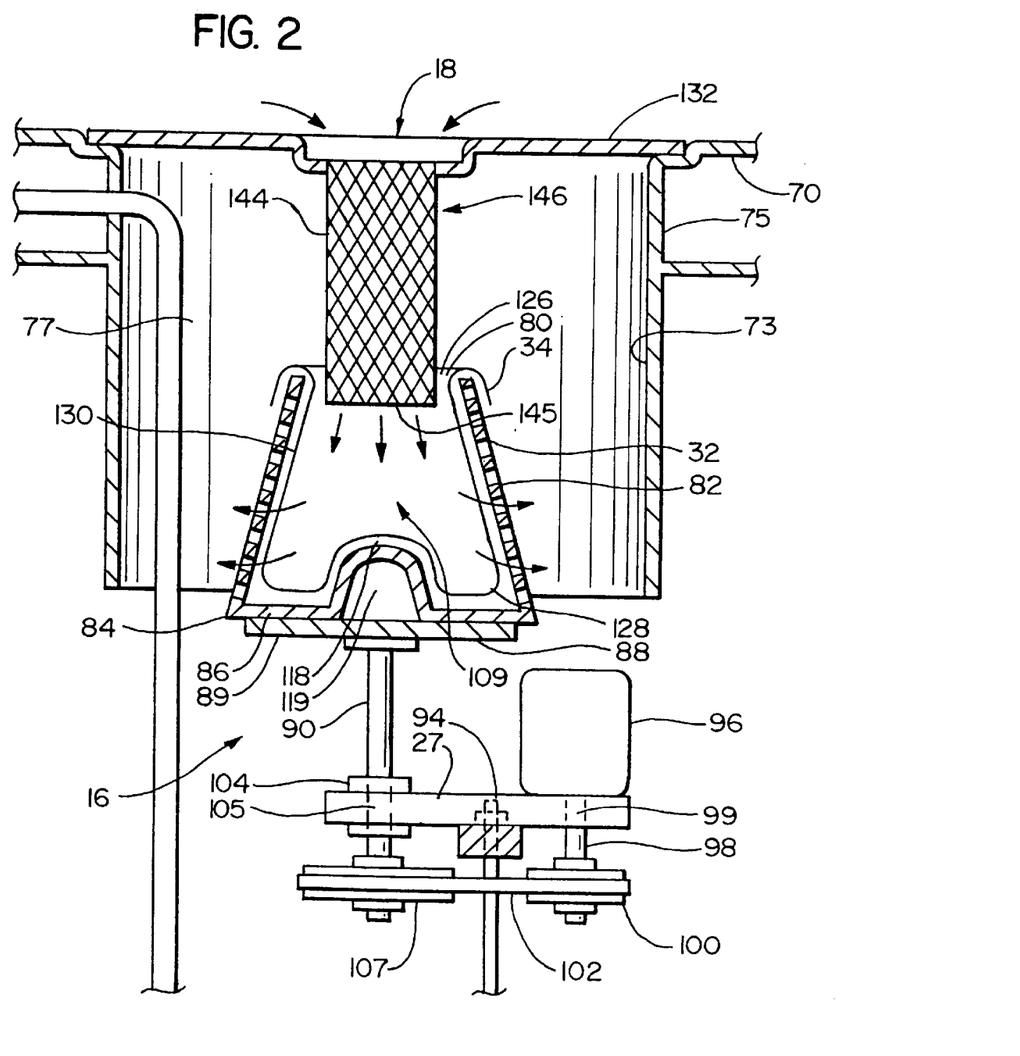
FIG. 2 is an enlarged portion of FIG. 1 showing the centrifugal filter assembly and mounting bracket.

The centrifugal filter assembly 16 is best seen in FIG. 2. The centrifugal filter assembly 16 is mounted to the collar 72 with a mounting bracket 27, so that a filter receptacle 32 is positioned directly below the drain 18. The centrifugal filter assembly 16 is comprised of a filter receptacle 32 with an open top end 80, a perforated circumferential side wall 82, and a base 84. The filter receptacle 32 is preferably made from stainless steel, although other solvent resistant metals and plastics may also be used. The filter receptacle base 84 has an interior upward facing imperforate portion 86 that is surrounded by the filter side wall 82 and an exterior downward facing portion 88. Attached to the downward facing portion is a circular mounting disk 89 that has a filter shaft 90 attached. If more convenient or economical in mass production, the circular mounting disk 89 can be omitted and the filter shaft 90 attached directly to the downward facing portion 88.

Figure 4:
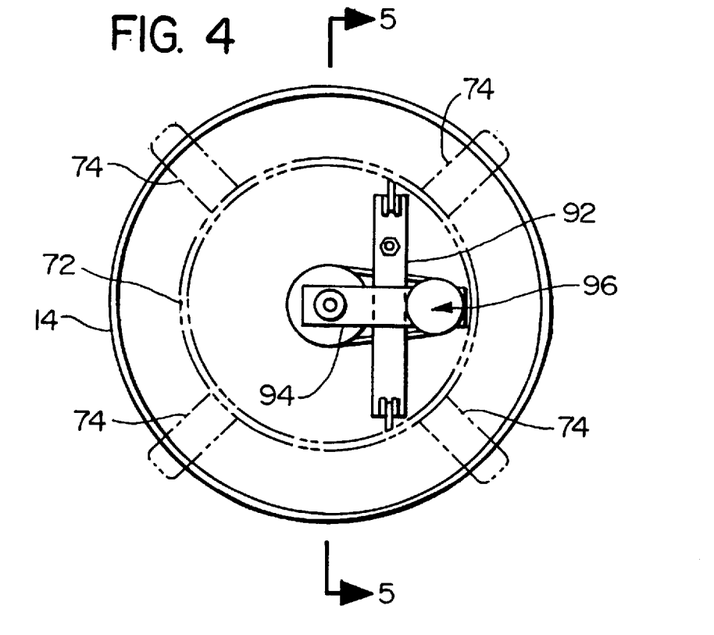
FIG. 4 is a plan view taken along line 4—4 in FIG. 1 looking downwardly through an access hatch in the parts washing basin and showing the mounting of the centrifugal filter assembly. Portions of the centrifugal filter assembly are omitted in order to show the mounting bracket in more detail.
Figure 5:
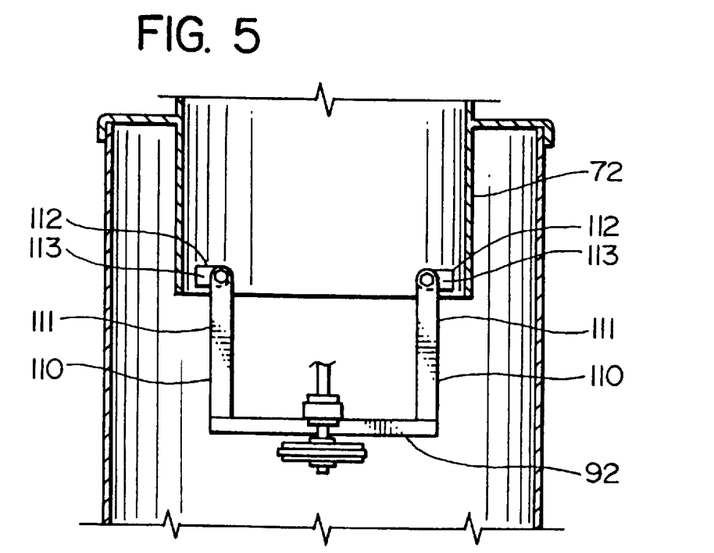
FIG. 5 is a cross-section view taken along line 5—5 in FIG. 4 that omits most the details of the centrifugal filter assembly in order to more clearly show the preferred manner in which the mounting bracket is attached to the underside collar of the parts washing basin.

The centrifugal filter assembly 16 is attached to the collar 72 on the underside 70 of the parts washing basin 12 using the mounting bracket 27 illustrated in FIGS. 4 and 5. The mounting bracket 27 is comprised of a longitudinal member 92 and a transverse member 94 that are attached to form a cross. A sealed motor 96 is mounted to one side the transverse member 94 with its shaft 98 extending through a hole 99 in the transverse member 94 (FIG. 2). The weight of the sealed motor 96 and the filter receptacle 32 are approximately equal so that their respective weights balance the transverse member 94 at its connection with the longitudinal member 92. While it is desirable to have this balance to ease the attachment and removal of the mounting bracket 27 to the parts washing basin 12, the balance of these parts is not necessary for the proper operation of the invention because the resiliency of the mounting bracket will properly position and support the centrifugal filter assembly 16 even though they may differ significantly in weight. A motor shaft pulley 100 is then attached near the end of the motor shaft 98. On the opposite side of the transverse member 94, a sealed bearing 104 is attached coaxial with another opening 105. The filter shaft 90 is placed within the sealed bearing 104 located in the opening 105 in the transverse member 94. A filter pulley 107 is attached to the end of the filter shaft 90. The motor shaft pulley 100 and the filter shaft pulley 107 are interconnected with a belt 102 so that, when energized, the motor 96 will spin the filter receptacle 32 about an axis with a generally vertical orientation drawn outwardly from the interior cavity 109 of the filter receptacle 32. Of course, the size of the pulleys 100, 107 and the rated speed of the motor 96 will control the rate of rotation of the filter receptacle 32. The faster this rate of spin, the greater the centrifugal force that will be exerted on the solvent entering the filter receptacle. Preferably, the filter receptacle will spin at approximately 450 to 500 revolutions per minute. At this rate of spin, the solvent is separated from the foreign waste materials without propelling the solvent upwardly toward drain 18 or unnecessarily atomizing it. Since the filter receptacle 32 is positioned with the interior cavity 77 of the collar 72, when the solvent 26 is forced through the filter element 34 and the perforated filter side wall 82 during operation of the parts washing apparatus 10, the solvent will either drop directly into the solvent reservoir 14 or be deflected into the solvent reservoir 14 by the interior surface 73 of the collar 72

Returning to FIG. 1, the pump 22 is removably attached by a pump extension 108 to the longitudinal member 92 through a hole which can be positioned anywhere on the longitudinal member 92, as long as the pump mounting extension 108 does not interfere with either the belt 102 or the pulleys 100, 105.

In FIG. 5, the attachment of the mounting bracket 27 to the collar 72 is illustrated. A support member 110 is attached to either side of the longitudinal member 92 so that each of the support members 110 extends upwardly to a point where its upper end 111 is removably connected to a bracket 112 that has been attached to the collar 72. It should be noted that slight modifications of the mounting bracket can be made by those skilled in the art to attach the centrifugal filter assembly 16 to many of the parts washers currently in use or on the market. These "adapted" mounting brackets are included with the remainder of the centrifugal filter assembly 16, described above, as the primary components in a retrofit kit to transform existing parts washers into the present invention. Secondary filter means 136 and tertiary filter means 148 are also preferably included with the retrofit kit, but can be deleted if already included on the existing parts washer.

In the preferred embodiment, two design features enable the filter receptacle to more efficiently use centrifugal force to separate the solvent from the waste. The first modification helps retain the solvent inside the filter receptacle until centrifugal force draws it through the filter media and the perforated side walls. Referring to FIG. 2, this is done by slightly slanting the perforated side wall 82 in a frusto-conical configuration upwardly and inwardly from the base 84 to the open top end 80. This upward and inward slant is preferably 12 to 14 degrees inwardly toward the vertical axis 106. The second design feature employs a deflecting member 118 that has a top rounded center portion 119 and a downwardly extending skirt 121 that slants outwardly from the vertical axis 106. The deflecting member 118 is attached to, or formed integrally from, the center 119 of the interior upward facing portion 86 of the base member 84. The purpose of the deflecting member 118 is to direct the solvent outwardly toward the side wall 82 and away from the center 119 of the filter receptacle 32 where the centripetal acceleration approaches zero and the solvent is less likely to be affected by the corresponding centrifugal force.

Figure 6:
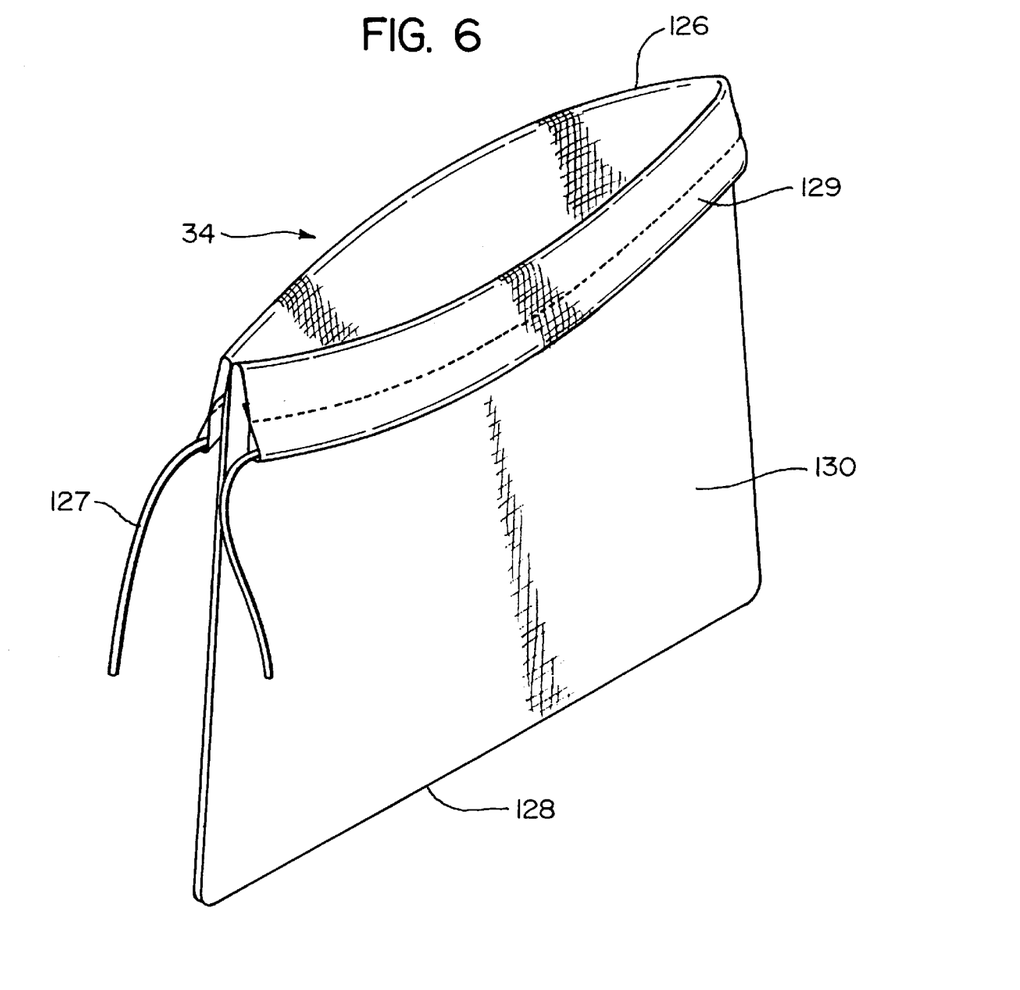
FIG. 6 is an isometric view of the filter element used in the filter receptacle of the centrifugal filter assembly.

During normal use, a disposable filter element 34 is draped inside the filter receptacle 32. Referring to FIG. 6, the upper open portion 126 of the disposable filter element 34 contains a securing means 127 that is folded over the open top portion 126 of the filter receptacle 32. The securing means 127, for instance, can be a string or elastic fiber that is sown into a channel 129 on the upper portion 126 of the disposable filter element 34. The lower closed portion 128 of the filter element drapes over the deflecting member 118. Preferably, the disposable filter element 34 is approximately the same size as the interior 109 of the filter receptacle 32, so that, when the filter receptacle 32 is spinning, the walls 130 of the disposable filter element 34 will cling to the filter side wall 82. The disposable filter element 34 is preferably made from a fine mesh linen cloth, although other filter media would work, for instance, a heavy, permeable paper filter. The preferred embodiment of the invention presently uses a 100 micron mesh linen for its filter media.

Figure 3:
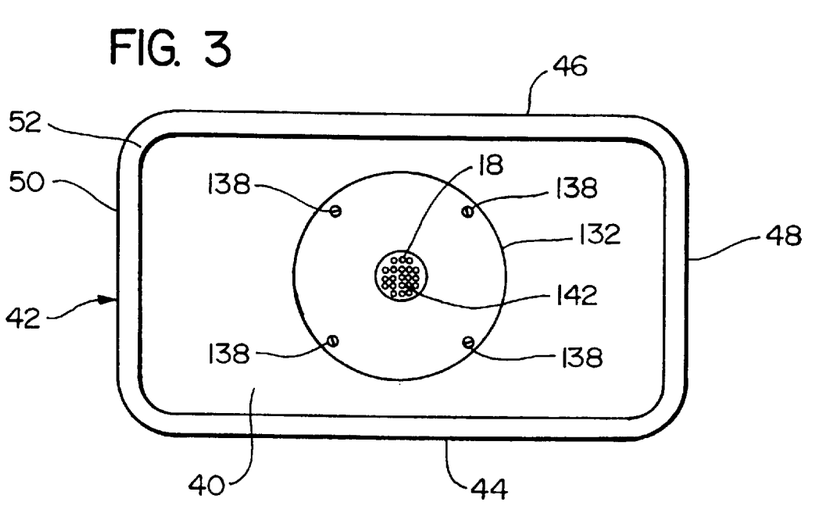
FIG. 3 is a plan view looking downwardly into the parts washing basin and showing the access hatch and the drain.

Returning to FIG. 3, the removable filter element 34 is accessed for service through a hatch 132 positioned above the filter receptacle 32 in the bottom portion of the sink 36. As shown in FIG. 3, the hatch 132 is circular and concentrically surrounds and includes the drain 18. The hatch lies in a round opening in the sink bottom wall 40 that has a circumferential lip that is formed lower than the upper surface of the sink bottom wall 40 in order to contain the circular hatch 132 (FIG. 1). The hatch 132 can be secured to the sink 36 with one or more screws 138 or can just rest in the indentation 134. A screen 142 usually covers the drain 18 and is particularly useful for keeping needed components of the part being washed from being flushed into the centrifugal filter assembly 16. In FIG. 3, the screen 142 is in the form of a disk that rests inside a circumferential indentation 143 (FIG. 1) that surrounds the drain 18. FIG. 2 shows another screen 144 that is formed into the shape of a cup and also rests in the circumferential indentation 143 that surrounding the drain 18. The cup screen 144 has an upper lip portion 141 that is held in indentation 143. It also has a bottom portion 145 with a contiguous circumferential side wall 147 that are both formed from a screen material that will retain relatively large pieces of foreign material that are washed from parts while passing the solvent and smaller foreign materials. Depending on the preference of the user, the disk configuration screen 142, the cup configuration screen 144, both, or neither, can be placed in the drain 18. Together, the screens 142, 144, comprise the secondary filter assembly 136.

A tertiary filter assembly 148 used to polish the solvent before being introduced to the parts washing basin 12 can optionally be included. The tertiary filter assembly 148 is one of common design and comprises a filter housing 150, a filter media 154 inside the filter housing, a filter cap 152 to seal the filter housing, an inlet 156 connected to the pump side 158 of the solvent transfer means 20, and an outlet 160 connected to the spigot side 162 of the solvent transfer means 20. The filter media usually takes the form of a filter cartridge comprised of a fan-folded permeable paper material, although many other filter media could be used.

As mentioned above, existing parts washers can be adapted to the present invention by using a retrofit fit kit comprising a centrifugal filter assembly 16 with a mounting bracket 27 specially adapted to mount the centrifugal filter assembly 16 to the existing parts washer. The retrofit kit also preferably includes the secondary filter assembly 136 and the tertiary filter assembly 148.

An existing parts washer will typically have a parts washing basin 12, a drain 18, and a collar 72 that are similar to those illustrated in FIG. 1. As in the present invention, the centrifugal filter assembly 16 is mounted below the drain 18 of the existing parts washer by connecting bracket 112 either to the collar 72 or to the underside portion 70 of the parts washing basin 12. Generally, bracket 112 has two ends joined at an angle to each other with a first end 113 attached to the upper end 111 of the support member 110 and the second end having a hole to receive a mounting bolt extending from the existing parts washer.

To mount the centrifugal filter assembly 10 to collar 72, for instance, the second end of bracket 112 could be specifically configured to align with a hole drilled in collar 72 by the retrofit installer. Bracket 112 is then bolted to collar 72 through these aligned holes. Similarly, bracket 112 could be rotated ninety degrees so that the second end of the bracket is substantially parallel to the sink bottom 40 and aligned with a hole drilled by the installer in the sink bottom 40. Bracket 112 is then bolted to sink bottom 40. A washer is placed around the mounting bolt passing through the sink bottom 40 and the bracket 112 to prevent solvent leakage through the hole. Bracket 112, therefore, can be thought of as an adapter for mounting the centrifugal filter assembly 10 to the existing parts washer. By altering its shape to conform to the existing parts washer and its length to properly position the centrifugal filter assembly 10 below drain 18, almost any existing parts washer could retrofitted to the present invention. Of course, bracket 112 could be omitted and the mounting bracket 27 could be specifically adapted for support member 110 to be attached to each type of existing parts washer. By altering the length of bracket 112, support 110, the transverse member 94 and the longitudinal member 92, the centrifugal filter assembly can be properly positioned in almost all existing parts washers. In any case, the means of attachment preferably allows the centrifugal filter 10 assembly to be removed while replacing filter element 34.

The pump 22 on the existing parts washer can be left in place if it does not obstruct the installation of the centrifugal filter assembly 10. Otherwise, the pump 22 is removed and then suspended by pump mounting extension 108 from mounting bracket 27, as is described above. The pump 22 and the motor 96 are electrically connected in parallel with the electrical wires passing through access 72. To complete the retrofit, the secondary filter means 136 is placed in drain 18 and the tertiary filter is connected in series with the solvent transfer means 20, in the same manner as is described above.

The ease of maintenance of the parts washing apparatus 10 is one of the primary design benefits reapplication the teaching of this application. To clean the apparatus 10, the user first removes the disk screen 142 and/or the cup screen 144 from the drain 18. The user then removes the hatch 132 from the bottom portion of the sink portion 36, exposing the filter receptacle 32 and the disposable filter media 34. At this point, the user can dump the contents of the screens 142, 144 into the disposable filter element 34, or the user can do the same after the disposable filter element 34 is removed. If necessary, the securing means of the disposable filter element 34 is loosened and the disposable filter element 34 is lifted from the filter receptacle 32. Because of the centrifugal force placed on the disposable filter 34 element during its use, the disposable filter element 34 and its contents should be mostly free of solvent. The used disposable filter element 34 is then placed in a container to be processed by a solvent service provider. The disposable filter media in the tertiary filter 148 can also be removed at this time and placed in the reprocessing container. The user then replaces the disposable filter element from the tertiary filter 148 in the filter receptacle, re-installs the hatch 132 and replaces screens 142, 144. If the tertiary filter 148 has been serviced, a new disposable filter element is placed in the tertiary filter 148 and the cap 152 replaced.

The entire service procedure on the parts washing apparatus 10 can be accomplished in a few minutes. The hazardous waste products removed from the system are all contained in the disposable filter element 34 and the disposable filter element of the tertiary filter assembly 148. This relatively small volume of hazardous waste material is sealed in a small and light container that is mostly free of solvent and that can easily and safely be transported to a hazardous waste processing plant. The solvent 26 remains relatively free of contaminants and may be re-used for a much greater length of time than is now possible under the state of the art.

While this invention has been described in terms of a preferred embodiment, it is contemplated that persons reading the preceding description and studying the drawing will realize various alterations, permutations and modifications thereof It is therefore intended that the following appended claims be interpreted as including all such alterations and modifications as fall within the true spirit and scope of the present invention.

What is claimed:

1. A centrifugal parts washing apparatus, comprising:
   a) a parts washing basin comprising a solvent transfer means for the controlled inflow of solvent to the parts washing basin, and a drain for draining the solvent from the parts washing basin;
   b) a solvent reservoir positioned below the drain for reception of solvent that drains from the parts washing basin;
   c) a centrifugal filter means positioned between the drain and the solvent reservoir to filter out accumulated foreign materials from the solvent before the solvent returns to the solvent reservoir;
   d) a pump for returning the solvent from the solvent reservoir, through the solvent transfer means to the parts washing basin, the centrifugal filter means further comprising:
      i) a filter receptacle having an open top end, a circumferential side wall defining an interior cavity, and a bottom portion;
      ii) rotational means for spinning the filter receptacle about a vertical axis having a substantial vertical alignment component;
      iii) the open top end of the filter receptacle being aligned with the drain from the parts washing basin so that the solvent flows into the filter receptacle for filtering,
   whereby a cycle consists of the solvent being pumped from the solvent reservoir, through the solvent transfer means, where it is used to clean parts, the solvent then drains from the parts washing basin into the filter receptacle of the centrifugal filter means where centrifugal force acts to throw solvent from the spinning filter receptacle while retaining the foreign materials within the filter receptacle, and where foreign material washed from the part is extracted from the solvent and the filtered solvent returns to the solvent reservoir where the cycle can begin again.

2. The centrifugal parts washing apparatus recited in claim 1, wherein the circumferential side wall is perforated with holes.

3. The centrifugal parts washing apparatus recited in claim 1, wherein the filter receptacle further comprises a solvent deflecting member attached to the bottom portion of the interior cavity of the filter receptacle and aligned along the vertical axis of the filter receptacle.

4. The centrifugal parts washing apparatus recited in claim 2, wherein the circumferential side wall slants from the bottom portion of the filter receptacle upwardly and inwardly toward the vertical axis so that the open top end defines an opening that is smaller in area than the area defined by the bottom portion of the filter receptacle.

5. The centrifugal parts washing apparatus recited in claim 1, wherein a removable filter media is positioned in the interior cavity of the filter receptacle so that, during operation of the parts washing apparatus, contaminated solvent drains into the filter media where the foreign material in the solvent is trapped by the removable filter media and centrifugal force first forces the solvent through the removable filter media and then the perforated circumferential side wall into the solvent reservoir.

6. The centrifugal parts washing apparatus recited in claim 1, further comprising:
   a secondary filter assembly removably placed in the drain and comprised of a screen.

7. The centrifugal parts washing apparatus recited in claim 1, further comprising:
   a tertiary filter assembly connected in series within the solvent transfer means, said tertiary filter assembly having an interior chamber containing a removable filter, an inlet connected to an input from the solvent transfer means for the introduction of dirty solvent to an input surface of the removable filter, and an outlet that is connected to an output side of the solvent transfer means for the egress of cleaned solvent from a output surface of the removable filter.

8. The centrifugal parts washing apparatus recited in claim 1, wherein the base of the filter receptacle is perforated with holes.

9. A centrifugal parts washing apparatus for use with a parts washing basin having a solvent transfer means and a drain, and a solvent drum containing solvent, comprising:

a centrifugal filter means, comprising:
   a filter receptacle having an open top end, a circumferential side wall defining an interior cavity, and a bottom portion;
   rotational means for spinning the filter receptacle about a vertical axis that has a substantial vertical alignment component;
a pump for recirculating solvent from the solvent drum, through the solvent transfer means, to the parts washing basin;
a mounting frame with an upper right and left portion attached to the parts washing basin, and a intermediate portion on which the filter receptacle, rotational means, and pump, are mounted so that the open top end of the filter receptacle is aligned with the drain from the parts washing basin, and the pump is submerged in the solvent contained in the solvent drum;
the filter receptacle being rotatably mounted on the mounting frame and interconnected with the rotational means so that, when activated, the rotational means will spin the filter receptacle about the vertical axis;
whereby, when the centrifugal parts washing apparatus is installed between the drain of the parts washing basin and the solvent drum and is activated, solvent will drain from the drain of the parts washing basin, into the filter receptacle where centrifugal force acts to throw solvent from the spinning filter receptacle into the solvent drum while retaining the foreign materials within the filter receptacle.

10. The centrifugal parts washing apparatus recited in claim 9, wherein the circumferential side wall is perforated with holes.

11. The centrifugal parts washing apparatus recited in claim 10, wherein the filter receptacle further comprises a solvent deflecting member attached to the bottom portion of the interior cavity of the filter receptacle and aligned along the vertical axis of the filter receptacle.

12. The centrifugal parts washing apparatus recited in claim 11, wherein the circumferential side wall slants from the bottom portion of the filter receptacle upwardly and inwardly toward the vertical axis so that the open top end defines an opening that is smaller in area than the area defined by the bottom portion of the filter receptacle.

13. The centrifugal parts washing apparatus recited in claim 10, wherein a removable filter media is positioned in the interior cavity of the filter receptacle so that, during operation of the parts washing apparatus, contaminated solvent drains into the filter media where the foreign material in the solvent is trapped by the removable filter media and centrifugal force first forces the solvent through the removable filter media and then the perforated circumferential side wall into the solvent reservoir.

14. The centrifugal parts washing apparatus recited in claim 10, further comprising:
a secondary filter assembly removably placed in the drain and comprised of a screen.

15. The centrifugal parts washing apparatus recited in claim 10, further comprising:
a tertiary filter assembly connected in series within the solvent transfer means, said tertiary filter assembly having an interior chamber containing a removable filter, an inlet connected to an input from the solvent transfer means for the introduction of dirty solvent to an input surface of the removable filter, and an outlet that is connected to an output side of the solvent transfer means for the egress of cleaned solvent from a output surface of the removable filter.

16. The centrifugal parts washing apparatus recited in claim 10, wherein the base of the filter receptacle is perforated with holes.

17. A centrifugal parts washing apparatus, comprising:
a) a parts washing basin comprising a solvent transfer means for the controlled inflow of solvent to the parts washing basin and a drain for draining the solvent from the parts washing basin;
b) a solvent reservoir positioned below the drain for reception of solvent that drains from the parts washing basin;
c) a centrifugal filter means positioned between the drain and the solvent reservoir to filter out accumulated foreign materials from the solvent before the solvent returns to the solvent reservoir;
d) a pump for returning the solvent from the solvent reservoir, through the solvent transfer means to the parts washing basin:
e) said basin having an access hatch means for access to the centrifugal filter means,
whereby a cycle consists of the solvent being pumped from the solvent reservoir, through the solvent transfer means, where it is used to clean parts, the solvent then drains from the parts washing basin into the centrifugal filter means, where foreign material washed from the part is extracted from the solvent and the filtered solvent returns to the solvent reservoir where the cycle can begin again.

18. A washing and filtering apparatus particularly adapted to wash parts, such as machine parts, where a washing solvent is recirculated and filtered in the apparatus, said apparatus comprising:
a) a wash basin comprising a sink which has a bottom wall and a surrounding side wall which has an upper edge portion which defines an upwardly open solvent containing washing area that is manually accessible so that said parts can be placed in said washing area to be washed by said solvent, said wash basin having a drain configured to retain parts in the basin and permit washing solvent to pass through the drain;
b) a centrifugal filter component positioned to receive the solvent from the drain and retain impurities from the solvent and permit the solvent to flow through the filter component;
c) a reservoir positioned to receive the filtered solvent from the centrifugal filter component;
d) a recirculating assembly which comprises a pump and recirculating line means and which is arranged so that the pump moves the solvent from the reservoir and through the recirculating line means to the wash basin.

19. The apparatus as recited in claim 18, wherein said centrifugal filter component comprises a rotatably mounted receptacle structure and a replaceable filter element, whereby impurities can be collected in the filter element and removed to a disposal location and a second filter element inserted in the receptacle structure.

20. The apparatus as recited in claim 19, wherein said centrifugal filter component has an upwardly directed opening and solvent flows by gravity from the basin to the upwardly directed opening.

21. The apparatus as recited in claim 19, wherein said receptacle structure has a circumferential side wall which is perforated with holes.

22. The apparatus as recited in claim 21, wherein said receptacle structure comprises a solvent deflecting member in an interior cavity of the receptacle structure and positioned at an axis of rotation of said receptacle structure.

23. The apparatus as recited in claim 21, wherein said receptacle structure has an axis of rotation which has a substantial vertical alignment component, and the circumferential side wall of the receptacle structure slants from a lower portion of the receptacle structure upwardly and inwardly so that solvent is urged by centrifugal force downwardly in said receptacle structure.

24. The apparatus as recited in claim 18, wherein said apparatus is arranged so that the solvent flows from the filter component to the reservoir by gravity flow.

25. The apparatus as recited in claim 24, wherein the solvent flows by gravity flow from the wash basin to the filter component.

26. The apparatus as recited in claim 18, wherein the solvent flows by gravity from the wash basin to the filter component.

27. The apparatus as recited in claim 18, wherein there is a hood member which is movable from an open position to a closed position to enclose said basin in the event of a fire occurring in the basin.

28. The apparatus as recited in claim 27, comprising fusible link means supporting the hood in an open position, and arranged to give way and permit the hood to close in the event a solvent fire in the basin.

29. The apparatus as recited in claim 18, wherein said reservoir comprises a containing structure having an upper end containing portion, and said basin is mounted to the upper end of the containing structure, said basin having a downwardly extending enclosure wall surrounding said centrifugal filter component to contain solvent discharge from said filter.

30. The apparatus as recited in claim 18, wherein said filter component comprises a receptacle structure rotatably mounted about an axis having a substantial vertical alignment component, and said filter component is supported by said wash basin, drive means operatively connected to said receptacle structure to cause rotation of said receptacle structure.

31. The apparatus as recited in claim 18, wherein said filter component comprises a containing member that has a containing wall defining a containing region in which the impurities are retained, and the containing member is removably mounted so that the containing member can be removed from the apparatus with the impurities contained therein.

32. The apparatus as recited in claim 31, wherein there is a rotatably mounted receptacle structure in which the containing member is positioned.

33. The apparatus as recited in claim 32, wherein said containing member is replaceable and a second containing member can be placed in the receptacle structure.

34. The apparatus as recited in claim 31, wherein said containing member is replaceable and a second containing member can be placed in the apparatus to be positioned to receive the solvent from the drain.

35. The apparatus as recited in claim 31, wherein said containing member comprises a permeable material to retain the impurities and permits said solvent to pass therethrough.

36. The apparatus as recited in claim 35, wherein said containing member comprises a bag made of a permeable material.

37. The apparatus as recited in claim 36, wherein said bag is made of a flexible material.

38. The apparatus as recited in claim 31, wherein said containing member comprises a permeable paper material.

39. A washing and filtering apparatus particularly adapted to wash parts, such as machine parts, where a washing solvent is recirculated and filtered in the apparatus, said apparatus comprising:

a) a wash basin comprising a sink which has a bottom wall and a surrounding side wall which has an upper edge portion which defines an upwardly open solvent containing washing area that is manually accessible so that said parts can be placed in said washing area to be washed by said solvent, said wash basin having a drain configured to retain parts in the basin and permit washing solvent to pass through the drain;

b) a centrifugal filter component positioned to receive the solvent from the drain, retain impurities from the solvent and permit the solvent to flow through the filter component;

c) a reservoir positioned to receive the filtered solvent from the centrifugal filter component;

d) a recirculating assembly which comprises a pump and a recirculating line to recirculate the solvent that is filtered by the filtered component back to the wash basin.

40. The apparatus as recited in claim 39, wherein said centrifugal filter component comprises a rotatably mounted receptacle structure and a replaceable filter element, whereby impurities can be collected in the filter element and removed to a disposal location and a second filter element inserted in the receptacle structure.

41. The apparatus as recited in claim 40, wherein said centrifugal filter component has an upwardly directed opening and solvent flows by gravity from the basin to the upwardly directed opening.

42. The apparatus as recited in claim 39, wherein said apparatus is arranged so that the solvent flows from the filter component to the reservoir by gravity flow.

43. The apparatus as recited in claim 42, wherein the solvent flows by gravity flow from the wash basin to the filter component.

44. The apparatus as recited in claim 39, wherein said filter component comprises a containing member that has a containing wall defining a containing region in which the impurities are retained, and the containing member is removably mounted so that the containing member can be removed from the apparatus with the impurities contained therein.

45. The apparatus as recited in claim 44, wherein there is a rotatably mounted receptacle structure in which the containing member is positioned.

46. The apparatus as recited in claim 45, wherein said containing member is replaceable and a second containing member can be placed in the receptacle structure.

47. The apparatus as recited in claim 44, wherein said containing member is replaceable and a second containing member can be placed in the apparatus to be positioned to receive the solvent from the drain.

48. The apparatus as recited in claim 44, wherein said containing member comprises a permeable material to retain the impurities and permits said solvent to pass therethrough.

\* \* \* \* \*